United States Patent [19]

Machuron

[11] 4,200,240

[45] Apr. 29, 1980

[54] APPARATUS FOR MINCING AND/OR BEATING AND/OR MIXING EDIBLE MATERIALS SUCH AS MEAT, FRUIT AND VEGETABLES

[76] Inventor: Robert M. Machuron, 37 rue Louis Desautels, Saint Vallier, France, 71230

[21] Appl. No.: 914,861

[22] Filed: Jun. 12, 1978

Related U.S. Application Data

[63] Continuation-in-part of Ser. No. 786,594, Apr. 11, 1977, abandoned.

[30] Foreign Application Priority Data

Sep. 16, 1976 [FR] France ............................. 76 2771

[51] Int. Cl.² .................... B02C 18/18; B02C 18/24
[52] U.S. Cl. .................................. 241/37.5; 241/92; 241/282.1
[58] Field of Search ............ 241/36, 37.5, 92, 199.12, 241/277, 282.1, 282.2

[56] References Cited

U.S. PATENT DOCUMENTS

| | | | |
|---|---|---|---|
| 3,024,010 | 3/1962 | Sperling | 241/282.1 X |
| 3,700,176 | 10/1972 | Haber | 241/282.1 X |
| 3,985,304 | 10/1976 | Sontheimer | 241/92 |
| 4,101,082 | 7/1978 | Mayer et al. | 241/282.1 |

FOREIGN PATENT DOCUMENTS

| | | | |
|---|---|---|---|
| 934249 | 10/1955 | Fed. Rep. of Germany | 241/199.12 |
| 1053044 | 1/1954 | France | 241/199.12 |

*Primary Examiner*—Howard N. Goldberg

[57] ABSTRACT

The invention relates to an apparatus for mincing and/or beating, comminuting, chopping, pulverizing, emulsifying, mixing, kneading, whisking and the like of materials, particularly edible materials, such as meat, starchy foods, fruit and vegetables which comprises a near-spherical container, at least one knife mounted for rotation within the container, coupled with safety features to prevent injuries to the operators.

4 Claims, 18 Drawing Figures

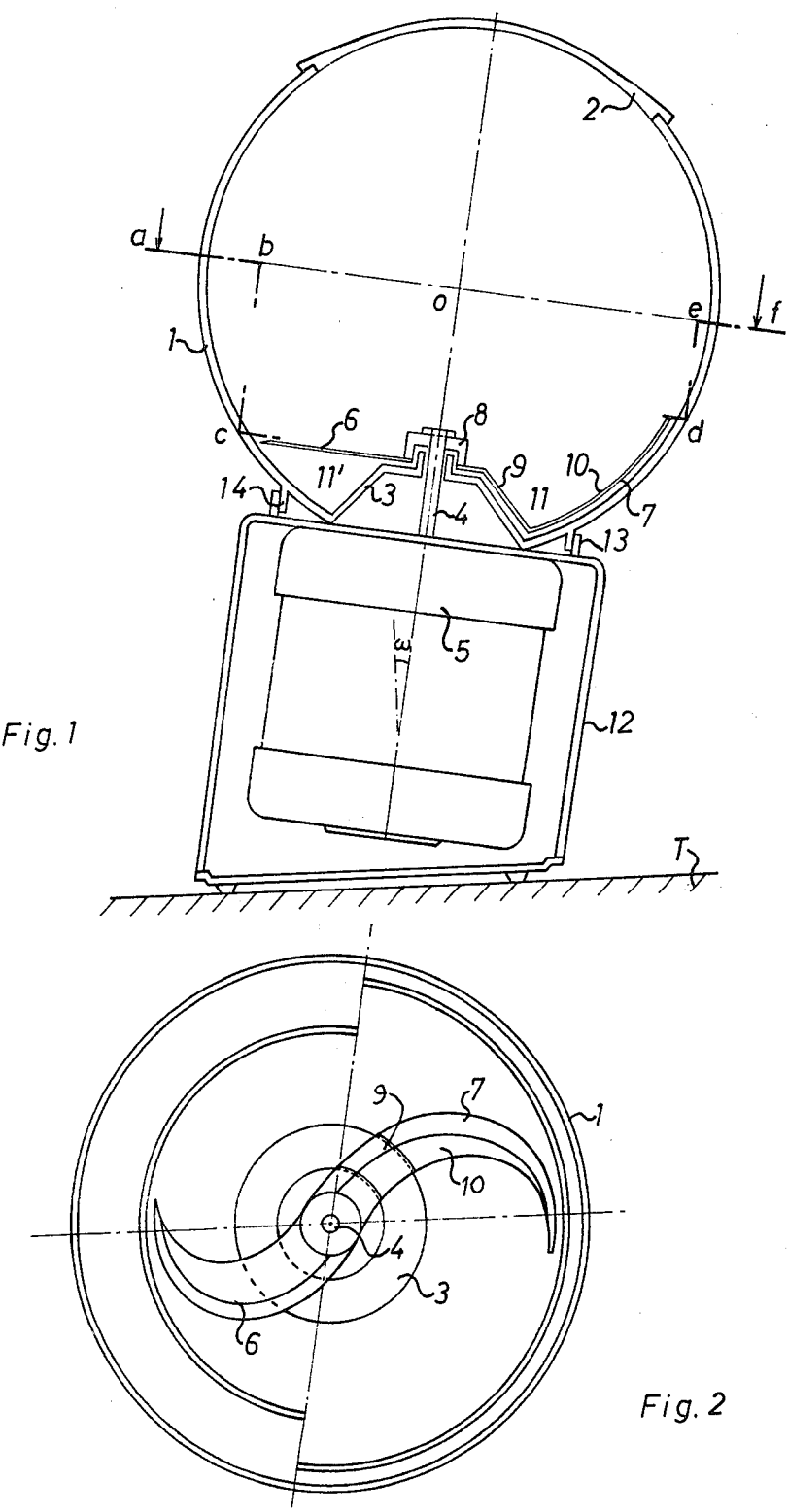

APPARATUS FOR MINCING AND/OR BEATING AND/OR MIXING EDIBLE MATERIALS SUCH AS MEAT, FRUIT AND VEGETABLES

CROSS-REFERENCE TO RELATED APPLICATIONS

This application is a continuation-in-part of copending U.S. application Ser. No. 786,594 filed Apr. 11, 1977, now abandoned, claiming priority of French patent application 76 27771, filed Sept. 6, 1976 and filing date of the U.S. application and the priority under the Convention of the French application are claimed herefor for all subject matters common to them.

BACKGROUND OF THE INVENTION

1. Field of the Invention

An apparatus for treating edible materials the intended operation of which includes mincing, beating, mixing, cutting, pulverising, whisking, emulsifying and the like. (Class 241/282X) 2. Description of the Prior Art U.S. Pat. Nos. 3,024,010 issued Mar. 6, 1962 to K. H. Sperling, 3,700,176 issued Oct. 24, 1972 to N. Haber, and French Pat. No. 1,053,044 published Jan. 29, 1954, to C. F. Jaeger, are made of record.

Food mincing and mixing apparatus are well known in many different forms, most of which employ knives or whisks which are rotated in a container or drum for the material to be treated. In one particular form of the apparatus, the knives are mounted for rotation about a horizontal axis within a semi-toric container; for achieving homogeneity of the resulting product, the container is given a rapid rotational movement about a vertical axis passing through the center of the container itself. The resulting complexity of the apparatus limits it to industrial users, such as butchers, bakers and confectioners.

A mixing apparatus which is simpler and therefore suitable for domestic use has a flat-bottomed container, in which one or more horizontal knives rotate adjacent the bottom of the container, with the knife ends passing close to the lateral wall of the container. In such an apparatus, there is a tendency for the treated material to move up in contact with the container wall, to which the material tends to stick and therefore to be incompletely worked by the knives.

SUMMARY OF THE INVENTION

In accordance with the present invention, an apparatus is provided for mincing and/or beating and/or mixing, having a near spherical container for materials to be treated and an inwardly directed protuberance in the form of a truncated cone. A knife or knives are mounted for rotation within the container, on a drive shaft passing through the protuberance. With such an apparatus, material rising up the wall of the container is automatically detached to fall back into the zone of the knife or knives. As the material moves up the wall the surface volume of the wall increases towards the horizontal diametrical plane of the container and facilitates a return movement of the material. Beyond the aforesaid diametrical plane, the forces of gravity on the material overcome the adhesive forces and thus cause the material to fall back into the interior of the container.

Preferably the knife, or one of the knives, has a blade portion which is arcuately curved to conform to the lower interior shape of the container and to extend contiguous thereto, from a location at the upper terminus of the shaft, downwardly along the frustoconical shape of the protuberance, then upwardly along the spherical surface of the container, to terminate in a first plane normal to the axis of rotation of the shaft, and lying between second and third planes passing respectively through the upper end of the shaft and the geometrical center of the sphere, all planes being parallel. The portion of the blade thus shaped is adapted to act on material located within an annular space between the lateral conical surface of the protuberance and the adjacent wall of the container. As a consequence, there is no dead space in which material can accumulate without being acted upon by the knife. There may additionally be at least one flat knife mounted to rotate parallel to the upper face of the protuberance and to operate on material disposed above that annular space. The flat knife or knives thus act on material present in considerable quantity, and/or while the material is falling back into the annular space from the wall. The combination of the actions of the two knives acting in different regions ensures that complete treatment of the material is achieved.

Preferably the shaft is inclined to the vertical at a relatively small or acute angle when the container is in operating position. As a result when there is only a small quantity of material to be treated, that material is located in the bottom portion of the annular space and is subjected very thoroughly to the action of the arcuately-curved knife, without any danger of the knife being operative only on the surface layers of the material. The driving shaft may be driven by any suitable means. However, in the preferred form of the invention, it is rotated by direct connection to the rotor shaft of an electric motor. The motor control circuit includes braking means by which the motor is quickly stopped when its circuit is opened. Coasting of the motor is thus obviated. As a further safety feature, switch means for the motor circuit are provided which are closed only by and in response to closure or emplacement of the cover of the container.

In another and preferred embodiment the container is removable, and can be separated from the base, and the container can be held on the base by securing means. This provision enables, firstly, the items of food to be treated to be placed in the container in advance and, secondly, the container to be very easily cleaned after use and independently of the base.

The invention also provides that the container may be equipped, instead of the knives, with either a slicing disc or a grating disc. In this case the invention provides two different covers, one for use with the knives and the other for use with the discs. The covers are each equipped with a tongue which, after the cover has been placed on the container and the cover has been rotated, forces down a button, thereby closing the starting contact of a motor. Further, the motor incorporates a device which causes the motor to be stopped immediately after the starting contact has been disengaged through the cover being rotated in the opposite direction.

As the cover can only be raised by this rotation in the opposite direction, by which the starting contact of the motor is opened, the user of the apparatus cannot be hurt or injured as, in order to reach the items of food being treated, he has to raise the cover and, hence, to open the starting contact for the motor. This represents a novel feature over the prior art apparatuses.

In accordance with a particular feature of the invention the shaft of the driving device is inclined by an angle of between 5° and 20° relative to the vertical. A number of experiments have shown that an angle within this range permits optimal processing of the items of food by the knives, and causes them to fall back to the base of the container in the most efficient way possible.

BRIEF DESCRIPTION OF THE DRAWINGS

FIG. 1 is a view in vertical section of the apparatus.

FIG. 2 is a section on the line a-b-c-d-e-f of FIG. 1.

DESCRIPTION OF THE PREFERRED EMBODIMENT

Figure 3:
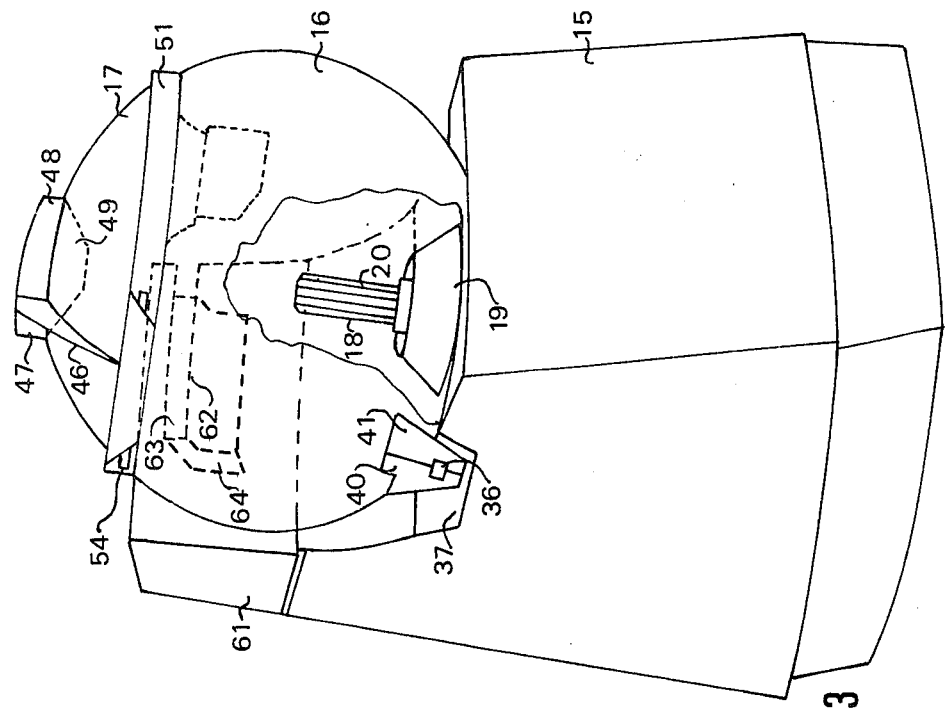
FIG. 3 is a perspective view of another embodiment of an apparatus according to the invention.

The apparatus illustrated in FIGS. 1 and 2 has a container 1, which is of near-spherical form and which has a removable cover 2, enabling material to be treated to be introduced into the container. The container 1 is mounted on or in a base or frame 12, by means of two interfitting rings or rims 13 and 14, ring 13 being integral with base 12 and ring 14 being integral with container 1. Base 12 forms a casing for an electric motor 5 having a drive shaft 4, and is so constructed that shaft 4 is inclined to the vertical by an angle ω, when the apparatus is located upon a horizontal table T. The inventor conducted a considerable amount of experiments and ascertained that the near-spherical container must be tilted to the optimum angle which is preferably between 5° to 20°. It will be understood that the motor housing encompasses the control circuitry subsequently described in connection with FIG. 16.

Container 1 is formed at its base with an inwardly-extending protuberance 3 which as shown is in the form of a truncated cone and through which extends the shaft 4 of motor 5. Mounted on the upper end of the shaft by means of a retainer ring 8, are two knives 6 and 7. Knife 6 is flat and as shown extends at right angles to the axis of the shaft. The blade of knife 7 comprises two portions or parts. First part 9 which is substantially planar or flat, closely conforms to the conical surface of protuberance 3 when the appliance is in operation. The other part 10 has a form which as shown upon FIG. 1, extends arcuately upwardly from a point at the outer or distal end of part 9 closely contiguous to the circular intersection of the base of protuberance 3 and the spherical surface of the container, to a point indicated at "d," lying in a plane intermediate a plane through the upper end of shaft 4 and another through the geometrical center of the container, all planes being parallel and normal to the axis of rotation of the shaft.

Part 10 as shown lies closely adjacent the wall of the container.

Also referring to FIG. 2 it is noted that the blade of knife 7, in plan, has the form of an "S," symmetrical with the axis of the shaft, the cutting edges being on and along the convex edges. That is, the blade rotates counterclockwise as viewed upon the figure.

An annular space 11–11' is defined between protuberance 3 and the adjacent wall of the container. It is in that space that the material accumulates when the quantity is small, it being noted that material within the space thus defined, is not subject to the action of blade 6 but, because of the particular form thereof, is subject to the action of blade 7.

The apparatus as described and illustrated is capable of being used for domestic and industrial purposes, only the dimensions varying according to the use for which it is intended. There is no dead space in which material can accumulate, without being treated. The material is thoroughly worked by the knives 6, 7, any material rising up the wall of the container being caused to fall back, as explained above, into the path of the knives. Because of the absence of any dead space, the apparatus can be used for the treatment of small quantities of material, the entire volume at the bottom of the container being swept by knife 7.

Although an electric motor 5 is shown for driving the blade 6, 7, it will be understood that other drive means may be employed, such as a hand driven mechanism.

In the preferred embodiment illustrated in FIG. 3 and in the following Figures an apparatus according to the invention comprises a base 15, a removable container 16, above which is a cover 17.

The base 15 encloses an electric motor (not shown) which drives an inclined shaft 18, which has a frustoconical base 19. The shaft 18 has splines 20. The container 16 has a base having a frustoconical protuberant portion 21 surmounted by a hollow column 22.

The frustoconical shape of the protuberant portion 21 matches that of the base 19, and the height of the hollow column 22 matches the height of the shaft 18.

Also, the upper part of the base 15 is in the form of a dished portion 23, which matches the shape of the lower spherical part of the container 16. Thus, when the container 16 has been placed in position, the frustoconical portion 21 and the column 22 surmount, and closely follow the shape of, the base 19 and shaft 18.

The apparatus comprises a device for attaching the removable container 16 to the base 15 so that, during operation, the container 16 and base 15 cannot be separated from each other. The fastening device comprises means for ensuring that the container 16 will be fast in rotation with the base 15, and means for locking the container 16 and base 15 to one another.

The means for making the container and base fast in rotation with one another are constituted by, firstly, two ribs 24 and 25 on the upper part of the base 15, this upper part being shaped as a dished part 23. The ribs 24 and 25 stand out from the wall 26 of the dished part 23, and lie diametrically opposite one another. These ribs 24, 25 are each constituted by a first, gently inclined face, 27 and 28, and by a second, more steeply inclined face 29 and 30. Container 16 also has two ribs 31 and 32, which are diametrically opposed, on its lower wall.

Figure 9A:
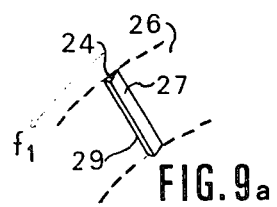
FIGS. 9a and 9b are perspective views of two ribs belonging to the base.
Figure 9B:
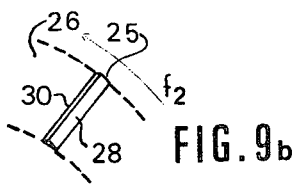

When the container 16 is placed on to the base 15 and the container 16 is turned in the direction in which the ribs 31 and 32 first meet the faces 27 and 28 (that is to say in the direction of arrows $f_1$ and $f_2$ of FIGS. 9a and 9b) it is easy, by continuing this rotation, to cause ribs 31 and 32 to pass ribs 24 and 25. The container 16 will then be in position for operation. The container cannot become disengaged through rotation in the opposite direction from that described above, because it would require the exertion of greater force to cause ribs 31 and 32 to pass ribs 24 and 25, as ribs 31 and 32 would then first have to cross the more steeply-inclined faces 29 and 30.

The means for locking the container 16 to the base 15 comprises two lugs 36, which belong to the base 15, are diametrically opposite one another relative to the shaft 18, and jut out in two recesses 37 formed in the outer wall of the base 15.

Provided for co-operation with the lug 36 are two slots 38 formed in two symmetrically disposed faces 39 on the wall of the container 16, close to the bottom of the latter. These faces 39 are constituted by two cheeks 40 and 41, which are offset relative to one another and interconnected by a shoulder 42.

When, prior to use and when the container 16 is positioned on the stand, the container 16 is turned so as to bring the ribs 31 and 32 in contact with ribs 24 and 25, in the manner described above, lug 36 lies behind cheek 41 and directly behind the part of the slot 38 formed in this cheek 41.

Figure 10:
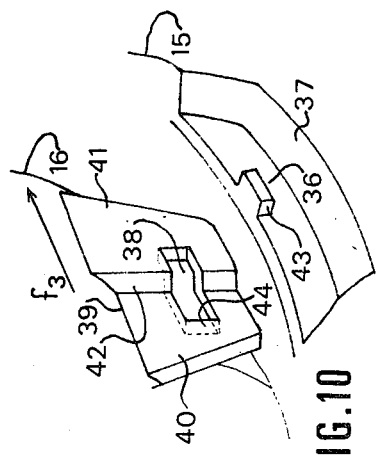
FIG. 10 illustrates the means for locking the container to the base.
Figure 14:
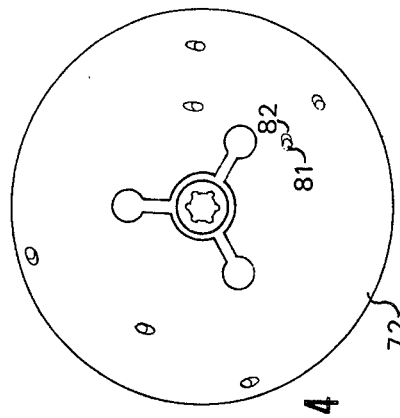
FIGS. 14 and 15 are views from below and in cross section, respectively, of a grating disc.
Figure 12:
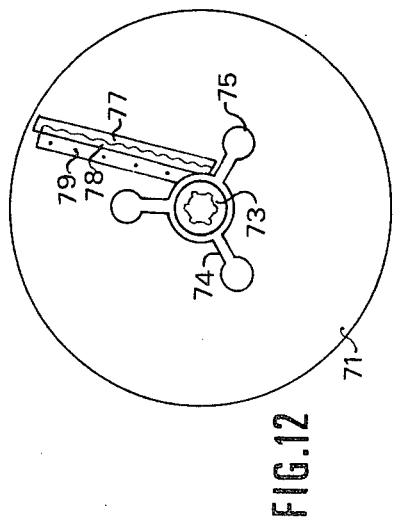
FIGS. 12 and 13 are views from below and in cross section, respectively, of a slicing disc.
Figure 13:
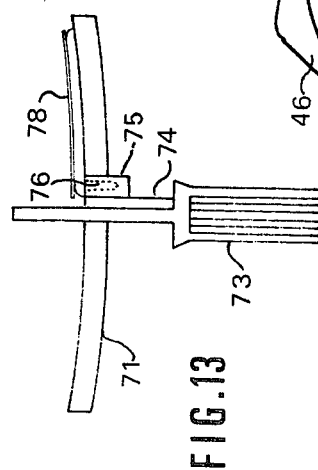
Figure 15:
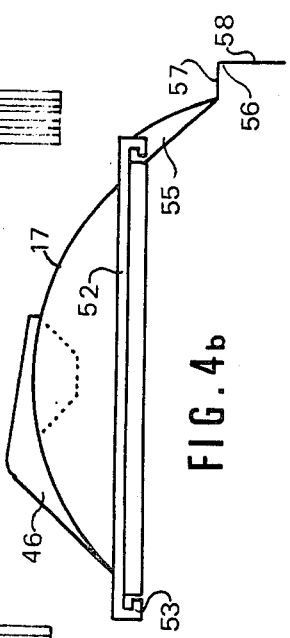

By rotating container 16 in the direction of arrow $f_3$ in FIG. 10 ribs 31 and 32 are caused to pass ribs 24 and 25, and lug 36 is brought into the part of slot 38 formed in the cheek 40.

The front face 43 of lug 36 comes into contact with the end 44 of slot 38, thereby preventing any continuation of rotation of container 16 relative to the base 15. The lug 36 then participates in making the container fast in rotation with the base.

Further, the lug 36 locks the container to the base, as this lug 36 is completely engaged in the part of the slot lying in cheek 40, and prevents any upward movement of the container relative to the base.

Figure 4A:
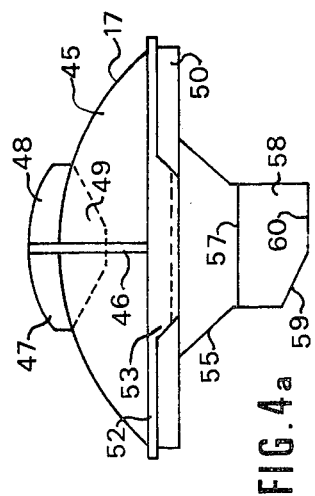
FIGS. 4a and 4b are front and side views of a cover.
Figure 4B:
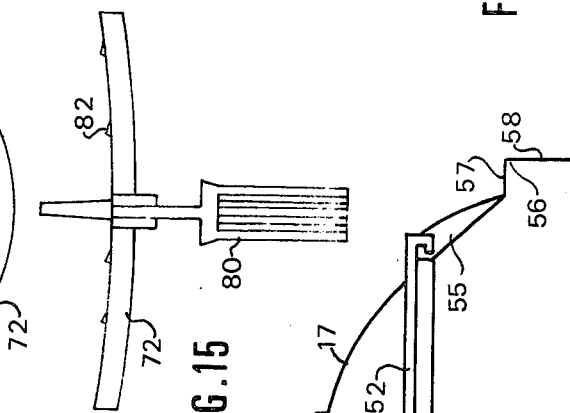

FIGS. 4a and 4b illustrate a cover which is similar to cover 17 illustrated in FIG. 3. It comprises an upper part 45 which is in the form of a spherical cap having a long projecting ridge 46 and two shorter ridges 47 and 48. The three ridges enable the cover to be easily manipulated.

The top of the spherical cap comprises a funnel 49 by means of which materials to be treated can be introduced into the container 16, in particular liquids. At the base of the spherical cap a lower cylindrical extension 50 corresponds to an upper projection 51 belonging to the container, the extension 50 lying within the extension 51 when the cover is in position.

The cover also comprises a circular rim 52 having two segments bent over to define a hook-like portion 53 which is intended to engage under two arcuate protuberances 54 of the upper extension 51 of the container 16. Rotating the cover relative to the container causes the protuberances 54 to engage in the hook-shaped segments 53, so that the cover is locked on to the container.

The cover 17 is equipped with a tongue 55 which is extended by a cranked part 56 composed of two flat segments 57 and 58 which together include a right angle. Segment 58 is cut across to define a bevel, and the two sides 59 and 60 of its lower portion together include an obtuse angle.

The base 15 (FIG. 3), which encloses the motor, comprises an upper extension 61 which forms a hood for a contact for starting the motor of the apparatus. The hood 61 is formed with a slot 62 in which the crank parts 56 can enter.

The slot 62 itself defines an elbow bend and is constituted by a first, substantially horizontal slot 63, which merges into a second, substantially vertical slot 64.

Figure 11:
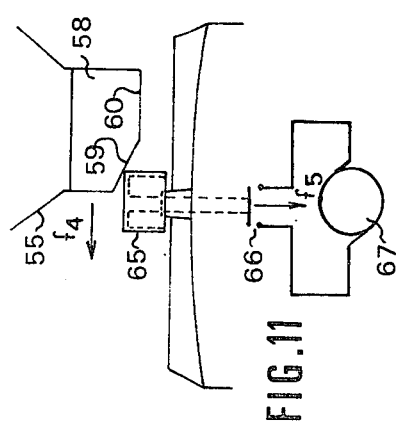
FIG. 11 is a view of the electrical contact mechanism for starting the motor.

During the turning movement by means of which cover 17 is locked to container 16, the segment 57 enters the slot 63, and segment 58 enters slot 64. During the turning movement of the cover 17 (FIG. 11) in the direction of arrow $f_4$ the side 59 of segment 58 comes into contact with a spring-loaded push knob 65. This knob or button 65 is pressed down in the direction of arrow $f_5$ until it abuts against the edge 60, thus closing a switch 66 serving to start the apparatus motor 67. Switch 66 is described with more details in conjunction with FIG. 16.

This reveals a notable feature of the apparatus, that is to say the rotation of the cover relative to the container thus causes this cover to be locked to the container and also causes the motor to be started. As soon as the items of food have been treated rotation of the cover in the opposite direction disengages the push button 65, thereby opening contact 66 and stopping the motor; at the end of the rotation of the cover the hook-shaped segments 53 disengage from the protuberant portions 54 and the cover can be raised.

Figure 5:
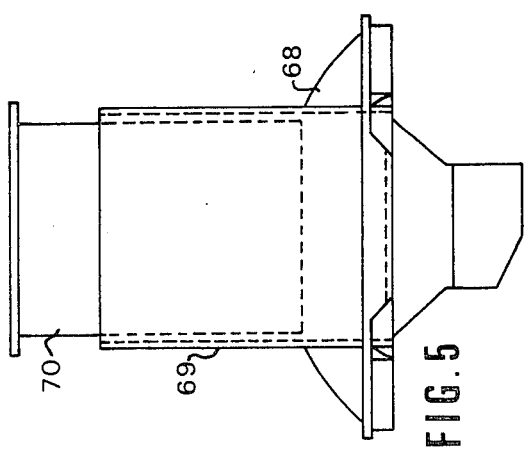
FIG. 5 is a front view of another form of cover.

FIG. 5 illustrates another cover 68 which can be fitted on the container 16. Cover 68 comprises the same means as cover 45 for securing it to the container, viz. rims and hook-shaped segments, and also the same means (as cover 45) for actuating the push button (a cranked tongue). In place of a funnel, cover 68 comprises a spout 69 by means of which the products to be treated can be introduced; cover 68 also comprises a plug or stopper 70.

FIGS. 12, 13 and 14, 15 respectively show discs 71 and 72, which can be fitted on the shaft 18 of the apparatus motor. Disc 71 is extended by an internally splined column or stem, which can engage on the splines 20 of shaft 18.

Stem 73 is connected to disc 71 by three ribs 74 each of which carries a stud 75, in which a screw 76 makes the disc fast with the corresponding rib 74.

Disc 71 is formed with a substantially radial slot 77; a toothed blade 78 is spot-welded (79) slightly above, and set back from, slot 77.

Disc 72 is also extended by a stem 80, which is internally splined in the same manner as stem 73.

Stem 80 is secured to disc 72 in the same way as stem 73 is secured to disc 71. Disc 72 is formed with a number of substantially circular, small orifices 81, and a part 82 of the edge of each orifice 81 is upwardly raised so as to form a number of small knives.

Figure 6:
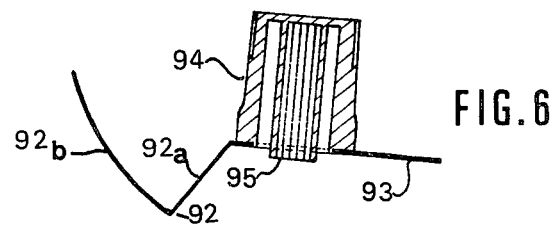
FIG. 6 is a cross-sectional view of the knives.

FIG. 6 shows two knives 92 and 93 mounted on a ring 94. These knives 92, 93 each has a blade which is identical to the blade of knives 6 and 7 of FIGS. 1 and 2.

Ring 94 is provided with a central tube 95 which is internally splined in such a way that splines exactly fit on the splines of shaft 18. The space defined between the ring 94 and the inner tube 95 corresponds to the column 22, so that the ring can fit over this column 22 when the apparatus is to be used with the knives.

Knife 92 comprises, like knife 7, two parts, viz. a planar portion 92$_a$ and an arcuate portion 92$_b$.

Figure 7:
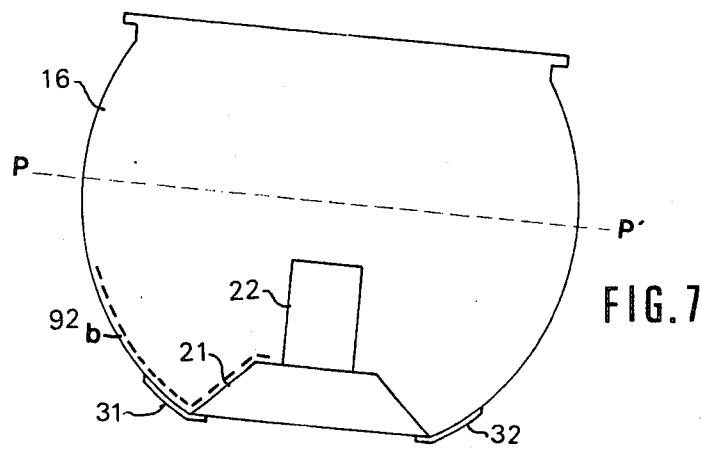
FIG. 7 is a cross-section through the container, without the cover.
Figure 8:
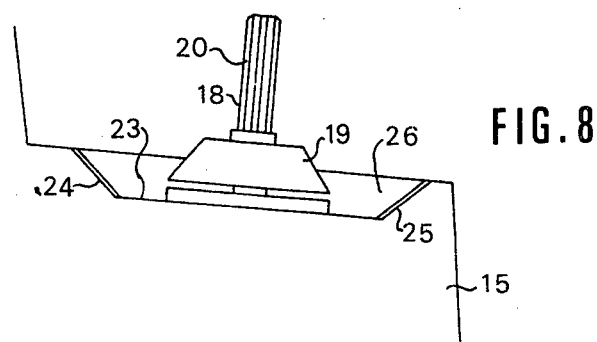
FIG. 8 is a view of the driveshaft, the base being shown partially cross-sectioned.

As is clear from FIG. 7, in which knife 92 is indicated by dashed line, the length of part 92$_b$ is such that its end lies below the plane P.P', which extends perpendicularly of the shaft 18 passing through the centre of the spherical container.

The two latches of the base and the combination of the two first ribs on the external surface of the ball with the two ribs on the base having a special profile of a gentle slope upwardly and a steep slope downwardly facilitate the anticlockwise rotation necessary to lock the ball and ensures that a clockwise rotation of the ball cannot occur such as from an occasional shock.

Figure 16:
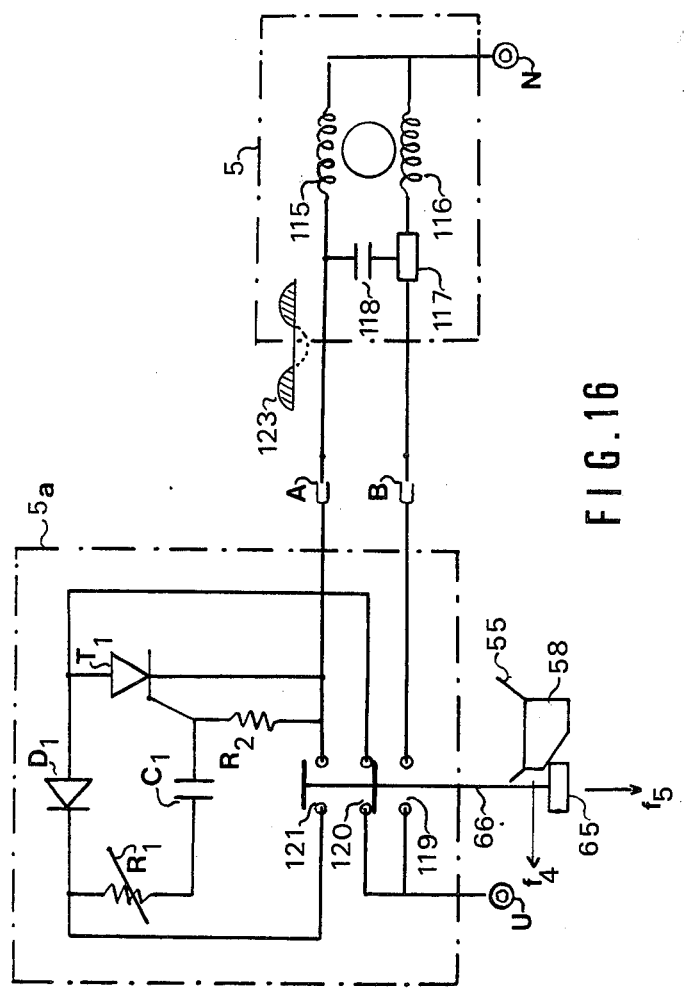
FIG. 16 depicts a wiring diagram, as an example, of a conventional electric braking apparatus which may be adapted to the device of the invention.

Referring to FIG. 16, motor 5 is indicated by dot-dash lines. Although the control parts are or may be enclosed within the motor casing, they are, for clarity of illustration and description, shown apart from the motor, enclosed within the dot-dash rectangle 5$a$. The motor is a single-phase machine equipped with two field coils 115 and 116, a relay or coupler 117 and a starting condenser 118. Coils 115 and 116 are connected to the neutral N of an a.c. supply. When connected through one pair of terminals 119 of an on-off switch 66 (see also FIG. 11), the motor is supplied by way of a terminal B. As will be noted from FIG. 16, switch 66 includes three pairs of terminals, namely, terminals 119 previously identified, 120 and 121. When in the "off" position shown upon the figure, terminals 120 are bridged. When in the "on" position, terminals 120 are opened and terminals 119 and 121 are closed. Passage of "off" to "on" position is due to the pressing down of spring-loaded push knob 65 by segment 58 as explained previously in connection with FIG. 11.

Contacts or terminals 120 connect phase U and the anode of thyristor T$_1$, the cathode of which is connected directly to motor terminal A, and to the anode of diode D$_1$. The cathode of D$_1$ is connected through terminals 121, to motor terminal A. Terminals 121 are shunted by a time-constant circuit comprising resistors R$_1$ and R$_2$, and condenser C$_1$. One terminal of the condenser is also connected to the trigger of tyristor T$_1$. When terminals 120 are bridged, this time circuit is supplied by diode D$_1$, with a half-wave current.

When switch 66 is in the "off" position of FIG. 16, terminals 119 are open and the motor is de-energized. Terminals 120 being closed at this time, condenser C$_1$ is charged. The voltage on the trigger of T$_1$ is then equal to that on its cathode and T$_1$ is blocked.

When switch 66 is moved to its "on" position, terminals 120 are opened and 119 and 121 are closed. The motor is energized through terminals 119. As terminals 121 are also bridged at this time, condenser C$_1$ is discharged, T$_1$ becomes unblocked but is not supplied since terminals 120 are open at this time. When switch 66 is again moved to the "off" position of FIG. 16, terminals 119 are opened and motor 5 is no longer supplied. T$_1$ being then unblocked, is supplied through presently-closed terminals 120. Terminals 121 are also open at this time. Thus motor terminal A is supplied with a half-wave current as indicated at 123, thus producing an instantaneous induction braking. But C$_1$ is then progressively charged through diode D$_1$ and resistances R$_1$ and R$_2$. When thus charged, C$_1$ blocks T$_1$, motor terminal A is no longer supplied and the motor is immediately brought to rest.

The combination of the circuitry of FIG. 16 with the ball mount to the base and the safety interlock controlled by the rotation of the cover ensures that the electric circuit is open when the cover is not locked. When the motor is shut off by the unlocking of the cover it stops immediately the shaft and leaves it free to rotate about its axis.

I claim:

1. In a power-driven mixing, comminuting and blending apparatus, a hollow base, an essentially spherical container supported on and surmounting said base to have an upright diametral axis of symmetry, said container at its base being formed as a re-entrant frusto-conical protuberance symmetrical about said axis at the lower end thereof, a shaft journaled in said base for rotation coaxially with said axis and extending upwardly through said protuberance and terminating below a first plane lying intermediate the top and bottom of the container and disposed normal to said axis, a knife fixed to the upper end of said shaft contiguous with and above said protuberance, said knife including a first portion passing radially outwardly and downwardly from said axis, closely adjacent to the surface of said protuberance, and a second portion integral with said first portion and arcuately shaped to extend upwardly from the radially-outward terminus of said first portion and closely adjacent to the surface of said container, said second portion terminating in a second plane normal to said axis and intersecting the same at a point substantially below the point of intersection of said first plane with said axis, means for securing the container to the base against rotation relative to the base and means for locking the container to the base, and a motor fixed to and within said base and connected with said shaft to rotate the same, said knife also including a third portion diametrically opposite from said first and second portions and lying in and rotating in a third plane normal to said axis and substantially below said second plane, said container having an access opening in its top, symmetrical with respect to said axis, and a cover to fit the rim of said opening to close the opening, said base being constructed and arranged, when supported on a horizontal surface, to mount said axis at an angle of 5° to 20° to the vertical.

2. A power-driven comminuting, mixing and blending apparatus comprising a hollow base, an essentially spherical container supported on and surmounting said base to have an upright diametral axis of symmetry, said container at its base being formed as a re-entrant frusto-conical protuberance symmetrical about said axis, a shaft journaled in said base for rotation coaxially with said axis and extending upwardly through said protuberance and terminating below a first plane lying intermediate the top and bottom of the container and disposed normal to said axis, a knife fixed to the upper end of said shaft contiguous with and above said protuberance, said knife including a first portion passing radially outwardly and downwardly from said axis, closely adjacent to the surface of said protuberance, said knife also including a second portion integral with said first portion and arcuately shaped to extend upwardly from the radially-outward terminus of said first portion and closely adjacent to the surface of said container, said second portion terminating in a second plane normal to said axis and intersecting the same at a point substantially below the point of intersection of said first plane with said axis, means for securing the container to the base against rotation relative to the base and means for locking the container to the base, and a motor fixed to and within said base and connected with said shaft to rotate the same, said knife also including a third portion diametrically opposite from said first and second portions and lying in and rotating in a third plane normal to said axis and substantially below said second plane, said container having an access opening in its top, symmetrical with respect to said axis, and a cover to fit the rim of said opening to close said opening, said base being constructed and arranged, when supported on a horizontal surface, to mount said axis at an angle of 5° to 20° to the vertical, and wherein said means for securing the container to the base comprises two ribs standing out from the container and co-operating with two ribs standing out from the base, said two ribs standing out from the base constituted by a gently-inclined face and by a more steeply-inclined face, and said means for locking the container to the base comprise two lugs projecting from the base and two cheeks on the container, a slot for the lugs being formed in said cheeks.

3. An apparatus as claimed in claim 2,
said motor having a starting contact with a push button;
said cover being equipped with a cranked lug;
said base being formed with a slot giving access to said push button;
said cranked lug to pass through said slot;
the lower portion of said cranked lug co-operating with the push button for closing and opening said starting contact.

4. An apparatus as claimed in claim 2, further comprising:
a braking means for the motor;
an electric circuitry actuating said braking means;
an on-off switch actuating said circuitry;
said circuitry comprising means to produce an instantaneous braking in the off position of said switch and when the motor is shut off by the unlocking of the cover safety interlock means controlled by the rotation of said cover to insure that the circuit remains open when the cover is not locked;
said switch means being closed only after emplacement of the cover on the container.

* * * * *